US012707475B2

(12) United States Patent
Li et al.

(10) Patent No.: US 12,707,475 B2
(45) Date of Patent: Aug. 11, 2026

(54) DCI SIZE ALIGNMENT METHOD AND DEVICE

(71) Applicant: VIVO MOBILE COMMUNICATION CO., LTD., Dongguan (CN)

(72) Inventors: Na Li, Dongguan (CN); Xiaodong Shen, Dongguan (CN); Xueming Pan, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 272 days.

(21) Appl. No.: 18/388,264

(22) Filed: Nov. 9, 2023

(65) Prior Publication Data

US 2024/0073922 A1 Feb. 29, 2024

Related U.S. Application Data

(63) Continuation of application No. PCT/CN2022/091253, filed on May 6, 2022.

(30) Foreign Application Priority Data

May 10, 2021 (CN) ......................... 202110506649.0

(51) Int. Cl.
*H04W 72/232* (2023.01)
*H04L 5/00* (2006.01)
*H04W 72/1273* (2023.01)

(52) U.S. Cl.
CPC ......... *H04W 72/232* (2023.01); *H04L 5/0044* (2013.01); *H04W 72/1273* (2013.01)

(58) Field of Classification Search
CPC ............ H04W 72/232; H04W 72/1273; H04L 5/0044
See application file for complete search history.

(56) References Cited

U.S. PATENT DOCUMENTS 10,791,544 B2 9/2020 Jung et al.
10,841,908 B2 11/2020 Seo et al.
(Continued)

FOREIGN PATENT DOCUMENTS

CN 110536448 A 12/2019
CN 110839291 A * 2/2020 ........ H04W 72/0453
(Continued)

OTHER PUBLICATIONS

Wilus Inc., "Remaining Issues on DCI enhancement for NR URLLC", 3GPP TSG RAN WG1 #99, Reno, USA, Nov. 18-22, 2019, R1-1913067.
(Continued)

*Primary Examiner* — Samina F Choudhry
(74) *Attorney, Agent, or Firm* — The Webb Law Firm

(57) ABSTRACT

A DCI size alignment method includes determining, by a communication device, whether a number of DCI sizes of a plurality of DCI formats meets a DCI size budget; and in a case that the DCI size budget is not met, performing a DCI size alignment operation on the plurality of DCI formats according to a DCI size alignment rule until the DCI size budget is met. The DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

20 Claims, 4 Drawing Sheets

(56) References Cited

U.S. PATENT DOCUMENTS

| | | | | |
|---|---|---|---|---|
| 11,792,790 | B2 | 10/2023 | Shi et al. | |
| 2020/0328840 | A1* | 10/2020 | Salah | H04W 24/08 |
| 2022/0167320 | A1 | 5/2022 | Lee et al. | |
| 2022/0225384 | A1* | 7/2022 | Takeda | H04W 72/04 |

FOREIGN PATENT DOCUMENTS

| | | | |
|---|---|---|---|
| CN | 111314162 | A | 6/2020 |
| CN | 112088566 | A | 12/2020 |
| WO | 2020085991 | A1 | 4/2020 |
| WO | 2020143802 | A1 | 7/2020 |
| WO | 2020204486 | A1 | 10/2020 |
| WO | 2021025174 | A1 | 2/2021 |
| WO | 2021056595 | A1 | 4/2021 |

OTHER PUBLICATIONS

Wilus, Inc., "On DCI enhancement for NR URLLC", 3GPP TSG RAN WG1 #98, Prague, CZ, Aug. 26-30, 2019, R1-1909366.

* cited by examiner

DCI SIZE ALIGNMENT METHOD AND DEVICE

CROSS-REFERENCE TO RELATED APPLICATIONS

This application is a Bypass Continuation Application of International Patent Application No. PCT/CN2022/091253, filed May 6, 2022, and claims priority to Chinese Patent Application No. 202110506649.0, filed May 10, 2021, the disclosures of which are hereby incorporated by reference in their entireties.

BACKGROUND OF THE INVENTION

Field of the Invention

This application pertains to the field of communications technologies, and particularly relates to a downlink control information (DCI) size alignment method and a device.

Description of Related Art

At least two DCI formats are newly introduced into new radio (NR), to increase flexibility of scheduling specific services, for example, a newly introduced MBS DCI format for scheduling multicast broadcast service (MBS).

SUMMARY OF THE INVENTION

According to a first aspect, a DCI size alignment method is provided, including: determining, by a communication device, whether a number of DCI sizes of a plurality of DCI formats meets a DCI size budget; and in a case that the DCI size budget is not met, performing a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

According to a second aspect, a DCI size alignment apparatus is provided, including: a determining module configured to: determine whether a number of DCI sizes of a plurality of DCI formats meets a DCI size budget; and a DCI size alignment module configured to: in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

According to a third aspect, a terminal is provided, where the terminal includes a processor, a memory, and a program or instructions stored in the memory and executable on the processor, and when the program or instructions are executed by the processor, the steps of the method according to the first aspect are implemented.

According to a fourth aspect, a terminal is provided, including a processor and a communication interface, where the processor is configured to determine whether a number of DCI sizes of a plurality of DCI formats meets a DCI size budget; and in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

According to a fifth aspect, a network-side device is provided, where the network-side device includes a processor, a memory, and a program or instructions stored in the memory and executable on the processor, and when the program or the instructions are executed by the processor, the method according to the first aspect are implemented.

According to a sixth aspect, a network-side device is provided, including a processor and a communication interface, where the processor is configured to determine whether a number of DCI sizes of a plurality of DCI formats meets a DCI size budget; and in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

According to a seventh aspect, a non-transitory readable storage medium is provided, where a program or instructions are stored in the non-transitory readable storage medium, and when the program or the instructions are executed by a processor, the method according to the first aspect are implemented.

According to an eighth aspect, a chip is provided, where the chip includes a processor and a communication interface, the communication interface is coupled to the processor, and the processor is configured to run a program or instructions to implement the method according to the first aspect.

According to a ninth aspect, a computer program/program product is provided, where the computer program/program product is stored in a non-transitory storage medium, and the program/program product is executed by at least one processor to implement the method according to the first aspect.

According to a tenth aspect, a communication system is provided, including: a terminal and a network-side device, where the terminal may be configured to perform the method according to the first aspect, and the network-side device may be configured to perform the method according to the first aspect.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by persons of ordinary skill in the art based on the embodiments of this application shall fall within the protection scope of this application.

In the specification and claims of this application, the terms such as "first" and "second" are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, there may be one or more first objects. In addition, "and/or" in this specification and claims indicates at least one of connected objects, and the symbol "I" generally indicates that the associated objects are in an "or" relationship.

It should be noted that techniques described in the embodiments of this application are not limited to a long term evolution (LTE) or LTE-advanced (LTE-A) system, and may also be applied to various wireless communication systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. In the following descriptions, a new radio (NR) system is described for an illustration purpose, and NR terms are used in most of the following descriptions, although these technologies may also be applied to other applications than an NR system application, for example, the 6th generation (6G) communication system.

Figure 1:
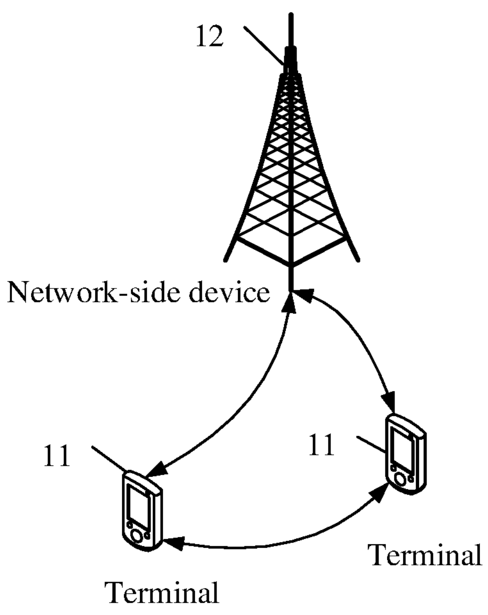
FIG. 1 is a schematic diagram of a wireless communication system according to an embodiment of this application.

FIG. 1 is a schematic diagram of a wireless communication system to which the embodiments of this application are applicable. The wireless communication system includes a terminal 11 and a network-side device 12. The terminal 11 may also be referred to as a terminal device or user equipment (UE), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a smart watch, a wrist band, earphones, glasses, or the like. It should be noted that a type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a next-generation NodeB (gNB), a home NodeB, a home evolved NodeB, a WLAN access point, a Wi-Fi node, a transmission and reception point (TRP), or another appropriate term in the art. Provided that a same technical effect is achieved, the base station is not limited to a specific technical term. It should be noted that in the embodiments of this application, the base station in the NR system is merely used as an example, and a type of the base station is not limited. The core network device may include but is not limited to at least one of: a core network node, a core network function, a mobility management entity (MME), an access mobility management function (AMF), a session management function (SMF), a user plane function (UPF), a policy control function (PCF), a policy and charging rules function (PCRF), an edge application service discovery function (EASDF), a unified data management (UDM), a unified data repository (UDR), a home subscriber server (HSS), a centralized network configuration (CNC), a network storage function (NRF), a network exposure function (NEF), a local NEF (L-NEF), a binding support function (BSF), or an application function (AF). It should be noted that, in the embodiments of this application, a core network device in an NR system is used as an example for description, and a type of the core network device is not limited.

At present, in a case of the newly introduced DCI format in NR, for maintaining complexity of blind detection for a terminal, a DCI size budget is not increased, and therefore, how to perform DCI size alignment to ensure that DCI sizes of all DCI formats for the terminal do not exceed the DCI size budget is a technical problem that needs to be resolved urgently.

The following describes in detail a DCI size alignment method and a device provided in the embodiments of this application by using some embodiments and application scenarios thereof with reference to the accompanying drawings.

Figure 2:
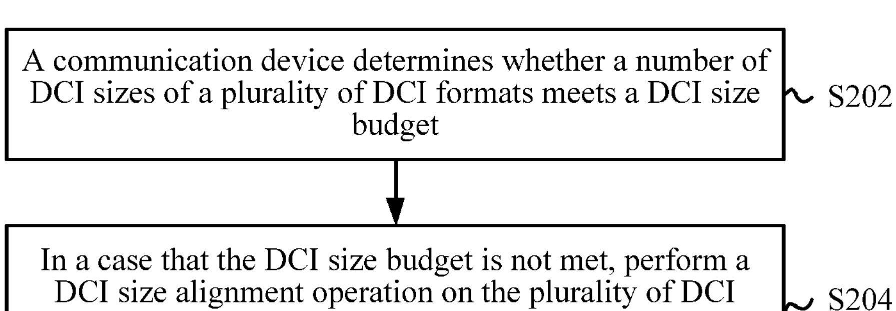
FIG. 2 is a schematic flowchart of a DCI size alignment method according to an embodiment of this application.

As shown in FIG. 2, an embodiment of this application provides a DCI size alignment method 200. The method may be performed by a communication device, in other words, the method may be performed by software or hardware installed in a communication device, and the communication device may be a terminal or a network-side device. The method includes the following steps.

S202: The communication device determines whether a number of DCI sizes of a plurality of DCI formats meets a DCI size budget.

Satisfying the DCI size budget described in this embodiment of this application may be satisfying at least one of the following two conditions that:

- condition 1: a total number of DCI sizes configured for monitoring by the terminal in a scheduled cell does not exceed 4; or
- condition 2: a total number of DCI sizes scrambled by cell radio network temporary identity (C-RNTI) and/or group radio network temporary identity (G-RNTI) and configured for monitoring by the terminal in a scheduled cell does not exceed 3.

The plurality of DCI formats described above may be all DCI formats that are configured by the network-side device for the terminal via radio resource control (RRC) signaling and that require monitoring by the terminal.

Optionally, the plurality of DCI formats include a first DCI format. The first DCI format may be a DCI format for scheduling MBSs that is newly introduced into the NR system. For example, the first DCI format is a DCI format for scheduling a group common physical downlink shared channel (PDSCH) and the like. The first DCI format may include DCI format A, DCI format B, or the like, as described in subsequent embodiments.

S204: In a case that the DCI size budget is not met, perform a DCI size alignment operation on the plurality of DCI formats according to a DCI size alignment rule until the DCI size budget is met.

The DCI size alignment rule may include at least one of the following (1) to (5):

(1) Aligning the first DCI format with DCI 0_0 and/or DCI 1_0 in a common search space (CSS) such that a DCI size of the first DCI format is equal to at least one of the following in the CSS: a DCI size of DCI 0_0 or a DCI size of DCI 1_0.

(2) Aligning the first DCI format with DCI 1_1 and/or DCI 0_1 in a UE-specific search space (USS) such that the DCI size of the first DCI format is equal to at least one of the following in the USS: a DCI size of DCI 1_1 or a DCI size of DCI 0_1.

(3) Aligning the first DCI format with DCI 1_2 and/or DCI 0_2 in the USS such that the DCI size of the first DCI format is equal to at least one of the following in the USS: a DCI size of DCI 1_2 or a DCI size of DCI 0_2.

(4) Aligning DCI 1_2 and/or DCI 0_2 in the USS with DCI 1_1 and/or DCI 0_1 such that the DCI size of the former is equal to the DCI size of the latter. The former herein includes at least one of the following: DCI 1_2 or DCI 0_2. The latter herein includes at least one of the following: DCI 1_1 or DCI 0_1.

(5) Aligning the first DCI format with the (other) group common DCI formats in the CSS such that the DCI size of the first DCI format is equal to the DCI size of the (other) group common DCI formats; where the first DCI format may also belong to the group common DCI format. The group common DCI formats mentioned in the example may include DCI 2_0, DCI 2_1, DCI 2_2, DCI 2_3, . . . , DCI 2-6, and the like, where DCI of the group common DCI format is used for controlling a group of terminal and is not normally used for scheduling data. In this embodiment, for details about how to align the first DCI format with the group common DCI format in the CSS, refer to related embodiments of the foregoing (1) or (2).

For example, for other group common DCIs other than the first DCI format, for example, including DCIs used for group control such as DCI 2_1 and DCI 2_2, in this embodiment, the DCI size of the first DCI format is made equal to both the DCI size of DCI 2_1 and the DCI size of DCI 2_2 by performing a zero-padding or truncation operation on the first DCI format.

For another example, for other group common DCIs other than the first DCI format, for example, including DCI 2_1 and DCI 2_2, in this embodiment, a zero-padding or truncation operation is performed on DCI 2_1 and a zero-padding or truncation operation is performed on DCI 2_2, such that the DCI size of DCI 2_1 is equal to the DCI size of the first DCI format and the DCI size of DCI 2_2 is equal to the DCI size of the first DCI format.

Further, for example, the terminal does not expect the network-side device to configure the DCI size of the other group common DCI formats to be different from the DCI size of the first DCI format, that is, the network-side device configures the DCI size of the other group common DCI formats to be equal to the DCI size of the first DCI format.

It should be noted that during execution of S204, a DCI size alignment operation may be performed on the plurality of DCI formats by performing at least one of (1) to (5) above. For example, upon completion of execution of the above (4), in a case that the DCI size budget is not met, (1) is executed, or in a case that the DCI size budget is met, the process is ended; or in a case that the DCI size budget is still not yet met, (2) or (3) may be executed again, and so on, until the DCI size budget is met.

In addition, during execution of S204, other DCI size alignment rules other than (1) to (5) above may alternatively be combined. For example, the communication device first aligns DCI 0_0 and DCI 1_0 in the CSS (that is, other DCI size alignment rules) so that the DCI size of DCI 0_0 and the DCI size of DCI 1_0 are equal; and then executes (1) above so that the DCI size of the first DCI format is equal to both of the following in the CSS: the DCI size of DCI 0_0 and the DCI size of DCI 1_0. The process is ended in a case that the DCI size budget is met.

As described above, the DCI size alignment method provided in this embodiment of this application may be performed by a network-side device, or may be performed by a terminal. The following provides description based on the differences between the two.

For the network-side device, the network-side device may configure the plurality of DCI formats for the terminal via RRC signaling. By performing the DCI size alignment method, the network-side device first determines whether the number of DCI sizes of the plurality of DCI formats meets the DCI size budget; and in a case that the DCI size budget is not met, performs a DCI size alignment operation on the plurality of DCI formats according to the DCI size alignment rule to reduce the total number of different DCI sizes until the DCI size budget is met.

In a case that the DCI size budget is met, the network-side device may alternatively send DCI to the terminal based on a DCI size obtained through the DCI size alignment operation.

For the terminal, the terminal may determine, via RRC signaling, a plurality of DCI formats to be monitored. By performing the DCI size alignment method, the terminal first determines whether the number of DCI sizes of the plurality of DCI formats meets the DCI size budget; and in a case that the DCI size budget is not met, performs a DCI size alignment operation on the plurality of DCI formats according to the DCI size alignment rule to reduce the total number of different DCI sizes until the DCI size budget is met.

In the case that the DCI size budget being met is determined, the terminal may further determine a DCI size for monitoring within the DCI size budget; and based on the determined DCI size, monitors the DCI format obtained through the DCI size alignment operation.

In the DCI size alignment method provided in this embodiment of this application, in the case of a newly introduced DCI format, the communication device performs a DCI size alignment operation on a plurality of DCI formats according to the DCI size alignment rule, so as to satisfy the DCI size budget. This embodiment of this application is conducive to maintaining consistent understanding between the network-side device and the terminal, which helps implement valid transmission of DCI. In addition, because the number of DCI sizes of the plurality of DCI formats meets the DCI size budget, this helps reduce complexity of blind detection for the terminal, thereby reducing resource overheads for the terminal.

The embodiment shown in FIG. 2 briefly describes the DCI size alignment rule through (1) to (5), and the following describes the DCI size alignment rule in detail with reference to methods 1 to 4.

Method 1: The first DCI format is aligned with fallback DCI in the CSS, where the fallback DCI mentioned herein may include DCI 0_0 and DCI 1_0.

Aligning the first DCI format with DCI 0_0 and/or DCI 1_0 in the CSS described in the embodiment 200 includes at least one of the following three options:

(a) If the DCI size of the first DCI format is less than a first value, performing zero-padding processing on the first DCI format such that the DCI size of the first DCI format is equal to the first value.

It should be noted that the zero-padding processing mentioned in the embodiments of this application may be adding 0 to the tail or the header of the original DCI; and the truncation processing mentioned in the embodiments of this application may be truncating the most significant bit (MSB) or the least significant bit (LSB) of frequency domain resource assignment (FDRA) field in the DCI.

(b) If the DCI size of the first DCI format is greater than the first value, performing truncation processing on the first DCI format such that the DCI size of the first DCI format is equal to the first value.

(c) Performing zero-padding or truncation processing on DCI 0_0 and performing zero-padding or truncation processing on DCI 1_0 such that the DCI size of DCI 0_0 and the DCI size of DCI 1_0 are equal to the DCI size of the first DCI format.

The first value mentioned in the foregoing examples is a DCI size obtained after alignment of DCI 0_0 and DCI 1_0 in the CSS.

Truncation processing on the first DCI format mentioned above may be truncating the frequency domain resource assignment (FDRA) field of the first DCI format, and after the truncation of FDRA, the terminal can perform resource allocation within the common frequency resource (CFR). For scheduling of all physical resource block (PRB) resources in the CFR, a manner of extending a granularity of resource allocation can be used, for example, for a resource indication value (RIV) form, X RBs can be used as the granularity of resource allocation, where X depends on the number of bits in the truncated FDRA and the number of RBs contained in the CFR. For a bitmap form, an RBG size can be increased, and the increased RBG size depends on the number of bits of the truncated FDRA and the number of RBs contained in the CFR.

For the purpose of describing the above method 1 in detail, the following provides description by using one embodiment, and the embodiment may be performed by the communication device, including the following steps.

Step 0:

Determine the DCI size of DCI 0_0 in the CSS;

determine the DCI size of DCI 1_0 in the CSS; and determine a DCI size of DCI format A in the CSS, which may be hereinafter referred to as size A.

It should be noted that DCI format A mentioned in the subsequent embodiments denotes the same meaning as the first DCI format described in the previous embodiments.

Optionally (this step may be omitted for case 2), the DCI size of DCI 0_0 is adjusted so that the DCI sizes of DCI 0_0 and DCI 1_0 are equal, to obtain size 1. Size 1 represents the DCI sizes of DCI 0_0 and DCI 1_0 obtained after alignment.

In this example, for example, 0 is added to the tail of DCI 0_0, or truncation processing is performed on the FDRA field of DCI 0_0 (for example, the MSB is truncated) such that the DCI sizes of DCI 0_0 and DCI 1_0 are equal (the bitwidth of the frequency domain resource assignment field in the DCI format 0_0 is reduced by truncating the first few most significant bits such that the size of DCI format 0_0 equals the size of the DCI format 1_0).

Step 2 may be divided into the following two cases, namely case 1 and case 2.

Case 1: If a size of size A is smaller than a size of size 1, zero-padding processing is performed on DCI format A so that a size of DCI format A is aligned with size 1. If the size of size A is greater than the size of size 1, truncation processing is performed on DCI format A so that the size of DCI format A is aligned with size 1.

Case 2: Align the sizes of DCI 0_0 and DCI 1_0 with the size of DCI format A. For example, zero-padding or truncation processing is performed on DCI 0_0 and zero-padding or truncation processing is performed on DCI 1_0 such that the DCI size of DCI 0_0 and the DCI size of DCI 1_0 are equal to the DCI size of the first DCI format.

Method 2: The first DCI format (in subsequent examples, using DCI format A as an example) is aligned with DCI 1_1 and/or 0_1 in the USS.

Aligning the first DCI format with DCI 1_1 and/or DCI 0_1 in the USS described in the embodiment 200 includes:

(a) aligning DCI 1_1 in the USS with DCI 0_1 such that the DCI size of DCI 1_1 is equal to the DCI size of DCI 0_1; and (b) in a case that the DCI size budget is still not yet met, performing zero-padding or truncation processing on DCI 1_1 and performing zero-padding or truncation processing on DCI 0_1 such that the DCI size of DCI 1_1 and the DCI size of DCI 0_1 are equal to the DCI size of the first DCI format.

It should be noted that during alignment of the DCI 1_1 with the DCI 0_1 in (a) above, a zero-padding operation may have been performed on DCI 1_1 or DCI 0_1. In (b) above, if truncation processing needs to be performed on DCI 1_1 or DCI 0_1, 0 added in (a) may be first removed.

Optionally, the aligning the first DCI format with DCI 1_1 and/or DCI 0_1 in the USS includes: aligning a second DCI format with the first DCI format such that the DCI size of the second DCI format is equal to the DCI size of the first DCI format; and in a case that the DCI size budget is still not yet met, aligning a third DCI format with the first DCI format such that the DCI size of the third DCI format is equal to the DCI size of the first DCI format; where the second DCI format is DCI 1_1 or DCI 0_1 and the third DCI format is a DCI format other than the second DCI format in DCI 1_1 and DCI 0_1.

Optionally, the second DCI format includes one of the following:

DCI 1_1;

DCI 0_1;

one of DCI 0_1 and DCI 1_1 that has a DCI size smaller than the DCI size of the first DCI format and that has a DCI size closest to the DCI size of the first DCI format;

one of DCI 0_1 and DCI 1_1 that has a DCI size closest to the DCI size of the first DCI format;

one of DCI 0_1 and DCI 1_1 that has a smaller DCI size; and one of DCI 0_1 and DCI 1_1 that has a larger DCI size.

For the purpose of describing the above method 2 in detail, the following provides description by using one embodiment, and the embodiment may be performed by the communication device, including the following steps.

Step 0:

Determine the DCI size of DCI 0_0 in the CSS;

determine the DCI size of DCI 1_0 in the CSS; and align DCI 0_0 and DCI 1_0 in the CSS by adjusting the size of DCI 0_0 (for example, by adding 0 to the tail when DCI 0_0 is shorter or by truncating the frequency domain resource assignment field when DCI 0_0 is longer) such that the sizes of the DCI 0_0 and DCI 1_0 for monitoring in the CSS are aligned so as to obtain Size 1 (CSS fallback).

It should be noted that "shorter" mentioned in the embodiments of this application may refer to a shorter number of bits (or DCI size) of the DCI; and "longer" mentioned in the embodiments of this application may refer to a longer number of bits (or DCI size) of the DCI.

Step 1:

Determine the DCI size of DCI 0_0 in the USS;

determine the DCI size of DCI 1_0 in the USS; and align the sizes of DCI 0_0 and DCI 1_0 for monitoring in the USS by adjusting a shorter DCI format (for example, adding 0 to the tail of the shorter one) to obtain Size2 (USS fallback).

Step 2:

Determine the DCI size of DCI 0_1 in the USS;

determine the DCI size of DCI 1_1 in the USS;

if DCI 0_1 for monitoring in the USS is the same as the DCI 0_0/1_0 in the USS, add 1-bit 0 to the tail of the DCI 0_1 for DCI size differentiation, so as to obtain Size3 (USS UL 0_1); and if DCI 1_1 for monitoring in the USS is the same as the DCI 0_0/1_0 in the USS, add 1-bit 0 to the tail of the DCI 1_1 for DCI size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B (optionally, this step may be any step prior to step 3): Determine the size of DCI format A, namely Size? (CSS DCI format A).

Step 3: End the procedure when the DCI size budget requirement is met (at most four DCI sizes per cell and at most three DCI sizes for C-RNTI and/or g-RNTI); otherwise, perform step 4.

Step 4: If the DCI size budget requirement is not met, then:

Step 4A: Remove 0 (if any) added in Step 2, and align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0), where Size2→Size1.

Step 4B: In a case that the DCI size budget is not met, align the DCI sizes of 0_2 and 1_2, that is, align Size5 and Size6 (for example, zero-padding processing is performed on a shorter DCI format), that is, Size5, Size6→size B.

Case 1:

Step 4C: In a case that the DCI size budget is not met, align the DCI sizes of 0_1 and 1_1, that is, align Size3 and Size4 (for example, zero-padding processing is performed on a shorter DCI format), that is, Size3, Size4→size C.

Step 4D:

In a case that the DCI size budget is not met, perform a zero-padding operation on the 0_1 and 1_1 that are output in 4C, to align sizes of DCI 0_1 and 1_1 with a size of DCI A, that is, SizeC→size 7, which is size 3, size 4→size 7.

Case 2:

Step 4C: In a case that the DCI size budget is not met, align a DCI size of 0_1 or 1_1 (assumed to be DCI Y_1) with the DCI size of DCI format A, where Size3 or Size4→size 7.

DCI Y_1 is determined based on at least one of:

DCI 1_1;

DCI 0_1;

one of DCI 0_1 and DCI 1_1 that has a DCI size smaller than the DCI size of the first DCI format and that has a DCI size closest to the DCI size of the first DCI format;

one of DCI 0_1 and DCI 1_1 that has a DCI size closest to the DCI size of the first DCI format;

one of DCI 0_1 and DCI 1_1 that has a smaller DCI size; or one of DCI 0_1 and DCI 1_1 that has a larger DCI size.

Step 4D:

If the DCI size budget requirement is not met, align a size of another DCI format other than DCI Y_1 in 0_1 or 1_1 with the size of DCI A, where Size4 or Size3→size 7.

Method 3: DCI format A is aligned with DCI 1_2/0_2 in the USS.

Aligning the first DCI format with DCI 1_2 and/or DCI format 0_2 in the USS described in the embodiment 200 includes:

(a) aligning DCI 1_2 in the USS with DCI 0_2 (for example, zero-padding processing is performed on a shorter DCI format) such that the DCI size of DCI 1_2 is equal to the DCI size of DCI 0_2; and (b) in a case that the DCI size budget is still not yet met, performing zero-padding or truncation processing on DCI 1_2 and performing zero-padding or truncation processing on DCI 0_2 such that the DCI size of DCI 1_2 and the DCI size of DCI 0_2 are equal to the DCI size of the first DCI format.

It should be noted that during alignment of the DCI 1_2 with the DCI 0_2 in (a) above, a zero-padding operation may have been performed on DCI 1_2 or DCI 0_2. In (b) above, if truncation processing needs to be performed on DCI 1_2 or DCI 0_2, 0 added in (a) may be first removed.

Optionally, the aligning the first DCI format with DCI 1_2 and/or DCI 0_2 in the USS includes: aligning a third DCI format with the first DCI format such that the DCI size of the third DCI format is equal to the DCI size of the first DCI format; and in a case that the DCI size budget is still not yet met, aligning a fourth DCI format with the first DCI format such that the DCI size of the fourth DCI format is equal to the DCI size of the first DCI format; where the third DCI format is DCI 1_2 or DCI 0_2; and the fourth DCI format is a DCI format other than the third DCI format in DCI 1_2 and DCI 0_2.

Optionally, the third DCI format includes one of the following:

DCI 1_2;

DCI 0_2;

one of DCI 0_2 and DCI 1_2 that has a DCI size smaller than the DCI size of the first DCI format and that has a DCI size closest to the DCI size of the first DCI format;

one of DCI 0_2 and DCI 1_2 that has a DCI size closest to the DCI size of the first DCI format;

one of DCI 0_2 and DCI 1_2 that has a smaller DCI size; and one of DCI 0_2 and DCI 1_2 that has a larger DCI size.

For the purpose of describing the above method 3 in detail, the following provides description by using one embodiment, and the embodiment may be performed by a communication device, including the following steps.

Step 0:

Determine the DCI size of DCI 0_0 in the CSS;

determine the DCI size of DCI 1_0 in the CSS; and align DCI 0_0 and DCI 1_0 in the CSS by adjusting the size of Format 0_0 (that is, DCI Format 0_0, referred to as DCI 0_0 for short, which is similar for other DCI formats) such that the sizes of the Format 0_0 and Format 1_0 (that is, DCI 1_0) for monitoring in the CSS are aligned (for example, 0 is added to the tail when DCI 0_0 is shorter; and the frequency domain resource assignment field is truncated when DCI 0_0 is longer), so as to obtain Size 1 (CSS fallback).

Step 1:

Determine the DCI size of DCI 0_0 in the USS;

determine the DCI size of DCI 1_0 in the USS; and align the sizes of Format 0_0 and Format 1_0 for monitoring in the USS by adjusting a shorter DCI format (by adding 0 to the tail) to obtain Size2 (USS fallback).

Step 2:

Determine the DCI size of DCI 0_1 in the USS;

determine the DCI size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B (optionally, this step may be any step prior to step 3): Determine the size of DCI A, namely Size? (CSS DCI format A).

Step 3: End the procedure when the DCI size budget is met (at most four sizes per cell, and at most three sizes for C-RNTI and/or g-RNTI); otherwise, perform step 4.

Step 4: If the DCI size budget requirement is not met, then:

Step 4A: Remove 0 (if any) added in Step 2, and align the USS fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0), where Size2→Size1.

Case 1:

Step 4B: In a case that the DCI size budget is not met, align the DCI sizes of 0_2 and 1_2, where Size5, Size6→size C.

Step 4B':

In a case that the DCI size budget is not met, perform a zero-padding operation on the 0_2 and or 1_2 that are output in 4B, and align sizes of DCIs 0_2 and 1_2 with the size of DCI A, where SizeC→size 7.

Case 2:

Step 4B: In a case that the DCI size budget is not met, align a DCI size of 0_2 or 1_2 (assumed to be DCI Y_1) with the DCI size of DCI format A, where Size5/Size6→size 7.

DCI Y_2 is determined based on at least one of:

DCI 1_2;

DCI 0_2;

one of DCI 0_2 and DCI 1_2 that has a DCI size smaller than the DCI size of the first DCI format and that has a DCI size closest to the DCI size of the first DCI format;

one of DCI 0_2 and DCI 1_2 that has a DCI size closest to the DCI size of the first DCI format;

one of DCI 0_2 and DCI 1_2 that has a smaller DCI size; or one of DCI 0_2 and DCI 1_2 that has a larger DCI size.

Step 4B':

In a case that the DCI size budget is not met, align another DCI format in 0_2 or 1_2 other than DCI Y_2 with the size of DCI A, where Size6/Size5→size 7.

Step 4C: In a case that the DCI size budget is not met, align DCI 0_1 and DCI 1_1, where Size3, Size4→size B.

Method 4: Align DCI 1_2/DCI 0_2 with DCI 1_1/DCI 0_1 in the USS.

Aligning DCI 1_2 and/or DCI 0_2 in the USS with DCI 1_1 and/or DCI 0_1 mentioned in the embodiment 200 includes:

aligning DCI 1_2 in the USS with DCI 0_2 such that a DCI size of DCI 1_2 is equal to a DCI size of DCI 0_2;

in a case that the DCI size budget is still not yet met, aligning DCI 1_1 in the USS with DCI 0_1 such that the DCI size of DCI 1_1 is equal to the DCI size of DCI 0_1; and in a case that the DCI size budget is still not yet met, aligning DCI 1_2 and DCI 0_2 that are obtained through alignment with DCI 1_1 and DCI 0_1 that are obtained through alignment, such that the DCI size of DCI 1_2, the DCI size of DCI 0_2, the DCI size of DCI 1_1, and the DCI size of DCI 0_1 are all equal (for example, a zero-padding operation is performed on a shorter DCI format or a truncation operation is performed on a longer DCI format).

Optionally, in the aligned DCIs 0_2, 1_2, 0_1, and 1_1, DCI 1_2 and DCI 0_2 include indicator bits, and DCI 1_1 and DCI 0_1 include indicator bits (that is, indicator bits are included in the aligned DCIs); where the indicator bits are used to differentiate between a fifth DCI format and a sixth DCI format, the fifth DCI format including DCI 1_2 and DCI 0_2, and the sixth DCI format including DCI 1_1 and DCI 0_1.

For the purpose of describing the above method 4 in detail, the following provides description by using one embodiment, and the embodiment may be performed by a communication device, including the following steps.

Step 0:

Determine the DCI size of DCI 0_0 in the CSS;

determine the DCI size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 1:

Determine the DCI size of DCI 0_0 in the USS;

determine the DCI size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine the DCI size of DCI 0_1 in the USS;

determine the DCI size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B (optionally, this step may be any step prior to step 3): Determine the size of DCI A, namely Size? (CSS DCI format A).

Step 3: End the procedure when the DCI size budget is met (at most four sizes per cell, and at most three sizes for C-RNTI and/or g-RNTI); otherwise, perform step 4.

Step 4: In a case that the DCI size budget is not met (the final sizes of Format 0_0 and Format 1_0 for monitoring in the CSS/USS are the same), Size2→Size1.

Step 4A: Remove 0 (if any) added in Step 2, and align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0), where Size2→Size1.

Step 4B: In a case that the DCI size budget is not met, align DCI 0_2 and DCI 1_2, where Size5, Size6→size C.

Step 4C: In a case that the DCI size budget is not met, align DCI 0_1 and DCI 1_1, where Size3, Size4→size B.

Step 4D: In a case that the DCI size budget is not met, align DCI 0_1 and DCI 1_1 as well as DCI 0_2 and DCI 1_2, that is, SizeB, SizeC→size D.

For example, 0 may be added to the tail of DCIs with smaller size, and for differentiation of the DCI formats, 1 bit may be added to the header of each DCI format to indicate the DCI format, that is, size D=size B/size C+1.

Optionally, for the foregoing method 2, method 3, and method 4, use of method 2, method 3, or method 4 may be determined according to at least one of the following case 1 or case 2:

Case 1: Determining is performed based on the DCI size of DCI 1_1, the DCI size of DCI 0_1, the DCI size of DCI 1_2, the DCI size of DCI 0_2, and the DCI size of the first DCI format, for example, which DCIs are closest to each other in size or which DCI has a size closest to the DCI size of the first DCI format and has a DCI size smaller than the DCI size of the first DCI format.

Case 2: Higher-layer signaling configuration.

In this way, the method provided in the previous embodiments further includes: determining the DCI size alignment rule according to at least one of: DCI size of DCI 1_1, DCI size of DCI 0_1, DCI size of DCI 1_2, DCI size of DCI 0_2, DCI size of the first DCI format, or higher-layer signaling configuration.

For example, the DCI size alignment rule is determined based on a seventh DCI format, and the seventh DCI format includes one of the following:

DCI 1_1;

DCI 0_1;

DCI 1_2;

DCI 0_2;

one of DCIs 0_1, 1_1, 0_2, and 1_2 that has a DCI size smaller than the DCI size of the first DCI format and that has a DCI size closest to the DCI size of the first DCI format;

one that has a DCI size closest to the DCI size of the first DCI format;

one of DCIs 0_1, 1_1, 0_2, and 1_2 that has a smaller DCI size; and one of DCIs 0_1, 1_1, 0_2, and 1_2 that has a larger DCI size.

In addition, the size of DCI format A (that is, the first DCI format) may be determined in at least one of:

(1) determining fields of DCI format A based on a parameter configuration of the common frequency resource (CFR), so as to further determine the size of DCI format A; or (2) directly configuring the DCI size of DCI format A via RRC.

In this way, the method provided in the foregoing embodiments further includes: determining the DCI size of the first DCI format based on at least one of:

(1) a size of each field of the first DCI format determined based on a parameter configuration of CFR; or (2) higher-layer signaling configuration. For example, the higher-layer signaling directly configures the DCI size of the first DCI format, or directly configures a size of at least one indication field, where sizes of other indication fields are already known to the terminal.

In order to describe in detail the DCI size alignment method provided in the embodiments of this application, the following provides descriptions with reference to several embodiments.

Embodiment 1

In this embodiment, the UE configures DCI formats 0_0, 1_0, 0_1, and 1_1 in the USS. DCI format A is configured in the CSS, where DCI format A is used for scheduling group common PDSCH (or an RNTI corresponding to DCI format A is a group common RNTI such as G-RNTI or G-CS-RNTI). Then the UE determines the size of DCI format according to the following procedure.

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2B (optionally, this step may be any step prior to step 3): Determine the size of DCI A, namely Size5 (CSS DCI format A).

Step 3: End the procedure when the DCI size budget is met (at most four sizes per cell, and at most three sizes for C-RNTI and/or G-RNTI), where the DCI budget requirement is both of the following conditions being met:

the total number of DCI sizes configured for monitoring in the cell does not exceed 4; and the total number of C-RNTI-scrambled and or G-RNTI-scrambled DCI sizes configured for monitoring in the cell does not exceed 3;

otherwise, perform step 4.

Step 4:

Step 4A: Remove 0 (if any) added in Step 2, align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0) (Size2→Size1).

Case 1:

Step 4C: In a case that the DCI size budget is not met, align DCI sizes of DCI 0-1 and DCI 1_1 (Size3, Size4→size C), so as to meet the DCI size budget requirement.

Case 2:

Step 4C: In a case that the DCI size budget is not met, align DCI 0_1 or DCI 1_1 (assumed to be DCI Y_1) with the size of DCI A (Size3 or Size44 size 5), so as to meet the DCI size budget requirement.

DCI Y_1 is determined based on at least one of:

DCI 1_1;

DCI 0_1;

DCI that is smaller than size 5 and closest to size 5;

DCI closest to size 5;

one of DCI 0_1 and DCI 1_1 that has a smaller size; or one of DCI 0_1 and DCI 1_1 that has a larger size.

Alternatively, the embodiment may alternatively be performed according to the following steps:

The base station configures DCI size A to be the same as size 1, or aligns DCI size A with the fallback DCI in the CSS.

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 0A (optionally, this step may be any step prior to this step): Determine the size of DCI A, namely Size5 (CSS DCI format A).

The size of DCI A is aligned with size 1 through the truncation (for example, being truncated starting from the MSB of FDRA) or zero-padding operation (for example, being performed at the tail or before the starting position).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 3: End the procedure when the DCI size budget is met (at most four sizes per cell, and at most three sizes for C-RNTI and/or G-RNTI), where the DCI budget requirement is both of the following conditions being met:

the total number of DCI sizes configured for monitoring in the cell does not exceed 4; and the total number of C-RNTI-scrambled and or G-RNTI-scrambled DCI sizes configured for monitoring in the cell does not exceed 3;

otherwise, perform step 4.

Step 4:

Step 4A: Remove 0 (if any) added in Step 2, align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0) (Size2→Size1).

So far, the DCI size budget requirement is met.

Embodiment 2

The UE configures the DCI formats 0_0, 1_0, 0_1, 1_1, 0_2, and 1_2 in the USS. DCI format A is configured in the CSS, where DCI format A is used for scheduling group common PDSCH (or an RNTI for DCI format A is a group common RNTI such as G-RNTI or G-CS-RNTI). Then the UE determines the size of DCI format according to the following procedure.

It should be noted that DCI format A and the first DCI format mentioned in the embodiments of this application may be in the CSS or may be in the USS.

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B (optionally, this step may be any step prior to step 3): Determine the size of DCI A, namely Size? (CSS DCI format A).

Step 3: End the procedure when the DCI size budget is met (at most four sizes per cell, and at most three sizes for C-RNTI and/or G-RNTI), where the DCI budget requirement is both of the following conditions being met:

the total number of DCI sizes configured for monitoring in the cell does not exceed 4; and the total number of C-RNTI-scrambled and or G-RNTI-scrambled DCI sizes configured for monitoring in the cell does not exceed 3;

otherwise, perform step 4.

Step 4:

Step 4A: Remove 0 (if any) added in Step 2, align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0) (Size2→Size1).

Step 4B: In a case that the DCI size budget is not met, align the DCI sizes of DCI 0_2 and DCI 1_2 (Size5, Size6→size B).

Case 1:

Step 4C: In a case that the DCI size budget is not met, align DCI sizes of DCI 0_1 and DCI 1_1 (Size3, Size4→size C).

Step 4D:

In a case that the DCI size budget is not met, perform a zero-padding operation on DCI 0_1 and DCI 1_1 that are output from 4C to align sizes of DCI 0_1 and DCI 1_1 with the size of DCI format A, (SizeC→size 7).

Case 2:

Step 4C: In a case that the DCI size budget is not met, align a size of 0_1 or 1_1 (assumed to be DCI Y_1) with the size of DCI A (Size3/Size4→size 7).

DCI Y_1 is determined based on at least one of:

DCI 1_1;

DCI 0_1;

DCI that is smaller than size 7 and closest to size 7;

DCI closest to size 7;

one of DCI 0_1 and DCI 1_1 that has a smaller size; or one of DCI 0_1 and DCI 1_1 that has a larger size.

Step 4D:

In a case that the DCI size budget is not met, align a size of another DCI format other than DCI Y_1 in DCI 0_1 or DCI 1_1 with the size of DCI A (Size4/Size3→size 7).

In addition, in this embodiment, the size of DCI format A may alternatively be aligned with the size of the fallback DCI in the CSS, which is size 1.

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 0A (optionally, this step may be any step prior to this step): Determine the size of DCI A, namely Size5 (CSS DCI format A).

The size of DCI A is aligned with size 1 through the truncation (for example, being truncated starting from the MSB of FDRA) or zero-padding operation (for example, being performed at the tail or before the starting position).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size6 (USS UL 0_2); and determine the DCI size of DCI 1_2 in the USS to obtain Size? (USS DL 1_2).

Step 3: End the procedure when the DCI size budget is met (at most four sizes per cell/at most three sizes for C-RNTI and/or G-RNTI), where the DCI budget requirement is both of the following conditions being met:

the total number of DCI sizes configured for monitoring in the cell does not exceed 4; and the total number of C-RNTI-scrambled and or G-RNTI-scrambled DCI sizes configured for monitoring in the cell does not exceed 3;

otherwise, perform step 4.

Step 4:

Step 4A: Remove 0 (if any) added in Step 2, align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0) (Size2→Size1).

Step 4B: In a case that the DCI size budget is not met, align the DCI sizes of DCI 0_2 and DCI 1_2 (Size5, Size6→size B).

Step 4C: In a case that the DCI size budget is not met, align DCI sizes of DCI 0_1 and DCI 1_1 (Size3, Size4→size C).

So far, the DCI size budget is met.

Embodiment 3

The UE configures the DCI formats 0_0, 1_0, 0_1, 1_1, 0_2, and 1_2 in the USS. DCI format A and DCI format B are configured in the CSS, where DCI format A and DCI format B are used for scheduling group common PDSCH (or an RNTI corresponding to DCI format A and DCI format B is a group common RNTI such as G-RNTI or G-CS-RNTI). Then the UE determines the size of DCI format according to the following procedure.

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 0A (optionally, this step may be any step prior to this step): Determine the size of DCI A, namely Size8 (CSS DCI format A).

The size of DCI format A is aligned with size 1 through the truncation (for example, being truncated starting from the MSB of FDRA) or zero-padding operation (for example, being performed at the tail or before the starting position).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B:

Determine the DCI size of DCI format B in the CSS to obtain Size? (USS DL 1_2).

Step 3: End the procedure when the DCI size budget is met (at most four sizes per cell, and at most three sizes for C-RNTI and/or G-RNTI), where the DCI budget requirement is both of the following conditions being met:

the total number of DCI sizes configured for monitoring in the cell does not exceed 4; and the total number of C-RNTI-scrambled and or G-RNTI-scrambled DCI sizes configured for monitoring in the cell does not exceed 3;

otherwise, perform step 4.

Step 4:

Step 4A: Remove 0 (if any) added in Step 2, align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0) (Size2→Size1).

Step 4B: In a case that the DCI size budget is not met, align the DCI sizes of DCI 0_2 and DCI 1_2 (Size5, Size6→size B).

Case 1:

Step 4C: In a case that the DCI size budget is not met, align DCI sizes of DCI 0_1 and DCI 1_1 (Size3, Size4→size C).

Step 4D:

In a case that the DCI size budget is not met, perform a zero-padding operation on 0_1 and 1_1 that are output from 4C to align sizes of DCI 0_1 and DCI 1_1 with the size of DCI A, (SizeC→size 7).

Case 2:

Step 4C: In a case that the DCI size budget is not met, align a size of 0_1 or 1_1 (assumed to be DCI Y_1) with the size of DCI A (Size3/Size4→size 7).

DCI Y_1 is determined based on at least one of:

DCI 1_1;

DCI 0_1;

DCI that is smaller than size 7 and closest to size 7;

DCI closest to size 7;

one of DCI 0_1 and DCI 1_1 that has a smaller size; or one of DCI 0_1 and DCI 1_1 that has a larger size.

Step 4D: In a case that the DCI size budget is not met, align a size of another DCI format other than DCI Y_1 in 0_1 or 1_1 with the size of DCI A (Size4 or Size3→size 7).

Alternatively, the embodiment may also use the following steps:

Step 0:

Determine a size of DCI 0_0 in the CSS;

determine a size of DCI 1_0 in the CSS; and align the DCI 0_0 and DCI 1_0 in the CSS by adjusting the size of Format 0_0 such that the sizes of the Format 0_0 and Format 1_0 for monitoring in the CSS are aligned (for example, 0 is added to the tail when Format 0_0 is shorter; and the frequency domain resource assignment field is truncated when Format 0_0 is longer), so as to obtain Size1 (CSS fallback).

Step 0A (optionally, this step may be any step prior to this step): Determine the size of DCI A, namely Size8 (CSS DCI format A).

The size of DCI A is aligned with size 1 through the truncation (for example, being truncated starting from the MSB of FDRA) or zero-padding operation (for example, being performed at the tail or before the starting position).

Step 1:

Determine a size of DCI 0_0 in the USS;

determine a size of DCI 1_0 in the USS; and align the sizes of Format 0_0 and Format 1_0 for monitoring in the USS by adjusting a shorter format (by adding 0 to the tail) to obtain Size2 (USS fallback).

Step 2:

Determine a size of DCI 0_1 in the USS;

determine a size of DCI 1_1 in the USS;

if Format 0_1 for monitoring in the USS is the same as the Format 0_0/1_0 in the USS, add 1-bit 0 to the tail of the DCI 0_1 for size differentiation, so as to obtain Size3 (USS UL 0_1); and if Format 1_1 for monitoring in the USS is the same as the Format 0_0/1_0 in the USS, add 1-bit 0 to the tail of the DCI 1_1 for size differentiation, so as to obtain Size4 (USS DL 1_1).

Step 2A:

Determine the DCI size of DCI 0_2 in the USS to obtain Size5 (USS UL 0_2); and determine the DCI size of DCI 1_2 in the USS to obtain Size6 (USS DL 1_2).

Step 2B (optionally, this step may be any step prior to step 3): Determine the size of DCI B, namely Size? (CSS DCI format A).

Step 3: End the procedure when the DCI size budget is met (at most four sizes per cell/at most three sizes for C-RNTI and/or G-RNTI).

Step 4: In a case that the DCI size budget is not met, (the sizes of Format 0_0 and Format 1_0 for monitoring in the CSS/USS are the same), Size2→Size1.

Step 4A: Remove 0 (if any) added in Step 2, and align the uss fallback DCI with the CSS fallback DCI (adjusting the size determining process of Format 0_0 and Format 1_0 for monitoring in the USS in Step 1, to obtain a size the same as the size of Format 0_0 and Format 1_0 for monitoring in the CSS in Step 0), where Size2→Size1.

Case 1:

Step 4B: In a case that the DCI size budget is not met, align the UL DL DCI sizes of DCI 0_2 and DCI 1_2 (Size5, Size6→size C).

Step 4B':

In a case that the DCI size budget is not met, perform a zero-padding operation on DCI 0_2 and or DCI 1_2 that are output in 4B, and align sizes of DCIs 0_2 and 1_2 with the size of DCI format B (SizeC→size 7).

Case 2:

Step 4B: In a case that the DCI size budget is not met, align a size of DCI 0_2 or DCI 1_2 (assumed to be DCI Y_1) with the size of DCI format B (Size5/Size6→size 7).

DCI Y_2 is determined based on at least one of:

DCI 1_2;

DCI 0_2;

DCI that is smaller than size 7 and closest to size 7;

DCI closest to size 7;

one of DCI 0_2 and DCI 1_2 that has a smaller size; or one of DCI 0_2 and DCI 1_2 that has a larger size.

Step 4B':

In a case that the DCI size budget is not met, align another DCI format in DCI 0_2 or DCI 1_2 other than DCI Y_2 with the size of DCI format B, that is, Size6/Size54 size 7.

Step 4C: In a case that the DCI size budget is not met, Size3, Size4→size B.

It should be noted that, for the DCI size alignment method provided by the embodiments of this application, the execution body may be a DCI size alignment apparatus, or a control module for executing the DCI size alignment method in the DCI size alignment apparatus. In the embodiments of this application, the DCI size alignment method being performed by the DCI size alignment apparatus is used as an example to describe the DCI size alignment apparatus provided in the embodiments of this application.

Figure 3:
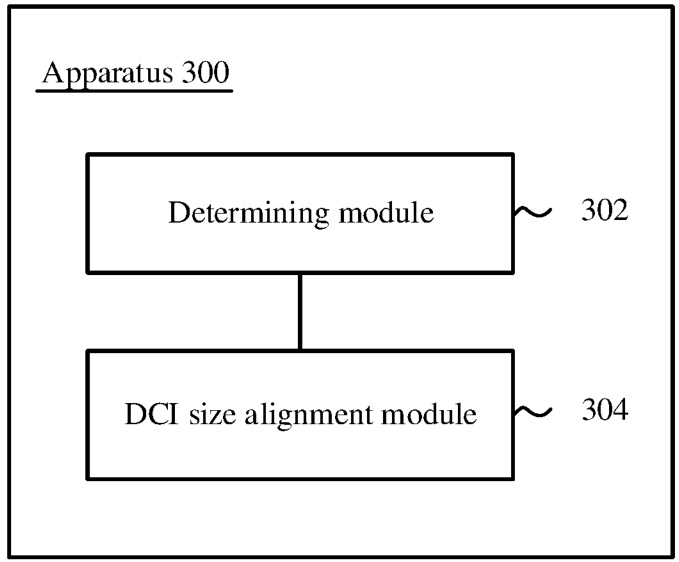
FIG. 3 is a schematic structural diagram of a DCI size alignment apparatus according to an embodiment of this application.

FIG. 3 is a schematic structural diagram of a DCI size alignment apparatus according to an embodiment of this application. The apparatus may correspond to a communication device in other embodiments, and the communication device may be a terminal or a network-side device. As shown in FIG. 3, the apparatus 300 includes the following modules:

- a determining module 302 configured to: determine whether a number of DCI sizes of a plurality of DCI formats meets a DCI size budget; and
- a DCI size alignment module 304 configured to: in a case that the DCI size budget is not met, perform a DCI size alignment operation on the plurality of DCI formats according to a DCI size alignment rule until the DCI size budget is met. The DCI size alignment rule includes at least one of the following (1) to (5):

(1) aligning a first DCI format with DCI 0_0 and/or DCI 1_0 in a CSS;

(2) aligning the first DCI format with DCI 1_1 and/or DCI 0_1 in a USS;

(3) aligning the first DCI format with DCI 1_2 and/or DCI 0_2 in the USS;

(4) aligning DCI 1_2 and/or DCI 0_2 in the USS with DCI 1_1 and/or DCI 0_1; or (5) aligning the first DCI format with a group common DCI format in the CSS.

In this embodiment of this application, in a case that a new DCI format is introduced, the apparatus 300 may perform, according to the DCI size alignment rule, the DCI size alignment operation on the plurality of DCI formats to satisfy the DCI size budget. This embodiment of this application is conducive to maintaining consistent understanding between the network-side device and the terminal, which helps implement valid transmission of DCI. In addition, because the number of DCI sizes of the plurality of DCI formats meets the DCI size budget, this helps reduce complexity of blind detection for the terminal, thereby reducing resource overheads for the terminal.

Optionally, as an embodiment, the plurality of DCI formats include a first DCI format, and the first DCI format is used for scheduling a group common PDSCH.

Optionally, as an embodiment, the aligning a first DCI format with DCI 0_0 and/or DCI 1_0 in a CSS includes at least one of the following (1) to (3):

(1) If a DCI size of the first DCI format is less than a first value, performing zero-padding processing on the first DCI format such that the DCI size of the first DCI format is equal to the first value.

(2) If the DCI size of the first DCI format is greater than the first value, performing truncation processing on the first DCI format such that the DCI size of the first DCI format is equal to the first value.

(3) Performing zero-padding or truncation processing on DCI 0_0 and performing zero-padding or truncation processing on DCI 1_0 such that a DCI size of DCI 0_0 and a DCI size of DCI 1_0 are equal to the DCI size of the first DCI format.

The first value is a DCI size obtained after alignment of DCI 0_0 and DCI 1_0 in the CSS.

Optionally, as an embodiment, the aligning the first DCI format with DCI 1_1 and/or DCI 0_1 in a USS includes: aligning DCI 1_1 in the USS with DCI 0_1 such that the DCI size of DCI 1_1 is equal to the DCI size of DCI 0_1; and in a case that the DCI size budget is still not yet met, performing zero-padding or truncation processing on DCI 1_1 and performing zero-padding or truncation processing on DCI 0_1 such that the DCI size of DCI 1_1 and the DCI size of DCI 0_1 are equal to the DCI size of the first DCI format.

Optionally, as an embodiment, the aligning the first DCI format with DCI 1_1 and/or DCI 0_1 in the USS includes: aligning a second DCI format with the first DCI format such that the DCI size of the second DCI format is equal to the DCI size of the first DCI format; and in a case that the DCI size budget is still not yet met, aligning a third DCI format with the first DCI format such that the DCI size of the third DCI format is equal to the DCI size of the first DCI format; where the second DCI format is DCI 1_1 or DCI 0_1 and the third DCI format is a DCI format other than the second DCI format in DCI 1_1 and DCI 0_1.

Optionally, as an embodiment, the second DCI format includes one of the following: DCI 1_1; DCI 0_1; one of DCI 0_1 and DCI 1_1 that has a DCI size smaller than the DCI size of the first DCI format and that has a DCI size closest to the DCI size of the first DCI format; one of DCI 0_1 and DCI 1_1 that has a DCI size closest to the DCI size of the first DCI format; one of DCI 0_1 and DCI 1_1 that has a smaller DCI size; and one of DCI 0_1 and DCI 1_1 that has a larger DCI size.

Optionally, as an embodiment, the aligning the first DCI format with DCI 1_2 and/or DCI 0_2 in the USS includes: aligning DCI 1_2 in the USS with DCI 0_2 such that a DCI size of DCI 1_2 is equal to a DCI size of DCI 0_2; and in a case that the DCI size budget is still not yet met, performing zero-padding or truncation processing on DCI 1_2 and performing zero-padding or truncation processing on DCI 0_2 such that the DCI size of DCI 1_2 and the DCI size of DCI 0_2 are equal to the DCI size of the first DCI format.

Optionally, as an embodiment, the aligning the first DCI format with DCI 1_2 and/or DCI 0_2 in the USS includes: aligning a third DCI format with the first DCI format such that the DCI size of the third DCI format is equal to the DCI size of the first DCI format; and in a case that the DCI size budget is still not yet met, aligning a fourth DCI format with the first DCI format such that the DCI size of the fourth DCI format is equal to the DCI size of the first DCI format; where the third DCI format is DCI 1_2 or DCI 0_2; and the fourth DCI format is a DCI format other than the third DCI format in DCI 1_2 and DCI 0_2.

Optionally, as an embodiment, the third DCI format includes one of the following: DCI 1_2; DCI 0_2; one of DCI 0_2 and DCI 1_2 that has a DCI size smaller than the DCI size of the first DCI format and that has a DCI size closest to the DCI size of the first DCI format; one of DCI 0_2 and DCI 1_2 that has a DCI size closest to the DCI size of the first DCI format; one of DCI 0_2 and DCI 1_2 that has a smaller DCI size; and one of DCI 0_2 and DCI 1_2 that has a larger DCI size.

Optionally, as an embodiment, the aligning DCI 1_2 and/or DCI 0_2 in the USS with DCI 1_1 and/or DCI 0_1 includes: aligning DCI 1_2 in the USS with DCI 0_2 such that a DCI size of DCI 1_2 is equal to a DCI size of DCI 0_2; in a case that the DCI size budget is still not yet met, aligning DCI 1_1 in the USS with DCI 0_1 such that the DCI size of DCI 1_1 is equal to the DCI size of DCI 0_1; and in a case that the DCI size budget is not yet met, aligning DCI 1_2 and DCI 0_2 that are obtained through alignment with DCI 1_1 and DCI 0_1 that are obtained through alignment, such that the DCI size of DCI 1_2, the DCI size of DCI 0_2, the DCI size of DCI 1_1, and the DCI size of DCI 0_1 are all equal.

Optionally, as an embodiment, the DCI 1_2 and DCI 0_2 include indicator bits, or the DCI 1_1 and DCI 0_1 include indicator bits; where the indicator bits are used to distinguish between a fifth DCI format and a sixth DCI format, the fifth DCI format including DCI 1_2 and DCI 0_2, and the sixth DCI format including DCI 1_1 and DCI 0_1.

Optionally, as an embodiment, the determining module 302 is further configured to determine the DCI size alignment rule according to at least one of: DCI size of DCI 1_1, DCI size of DCI 0_1, DCI size of DCI 1_2, DCI size of DCI 0_2, DCI size of the first DCI format, or higher-layer signaling configuration.

Optionally, as an embodiment, the determining module 302 is further configured to determine the DCI size of the first DCI format based on at least one of: a size of each field of the first DCI format determined based on a parameter configuration of a common frequency resource; or higher-layer signaling configuration.

Optionally, as an embodiment, the DCI size budget includes at least one of the following that: a total number of DCI sizes configured for monitoring by a terminal in a scheduled cell does not exceed 4; or a total number of DCI sizes scrambled by cell radio network temporary identity C-RNTI and/or group radio network temporary identity G-RNTI and configured for monitoring by a terminal in a scheduled cell does not exceed 3.

Optionally, as an embodiment, the determining module 302 is further configured to determine a DCI size for monitoring within the DCI size budget; and the apparatus (for example, the apparatus is a terminal) further includes a monitoring module configured to, based on the determined DCI size, monitor a DCI format obtained through the DCI size alignment operation.

For the apparatus 300 in this embodiment of this application, refer to the processes of the method 200 in the corresponding embodiments of this application, and the units or modules of the apparatus 300 and other operations and/or functions described above are used to implement the corresponding processes in the method 200, with the same or equivalent technical effects achieved. For brevity, details are not repeated herein.

The DCI size alignment apparatus in this embodiment of this application may be an apparatus, or an apparatus or electric device having an operating system, or may be a component, an integrated circuit, or a chip in the terminal. The apparatus or electric device may be a mobile terminal or a non-mobile terminal. For example, the mobile terminal may include but is not limited to the types of the terminal 11 listed above, and the non-mobile terminal may be a server, a network attached storage (NAS), a personal computer (PC), a television (TV), a teller machine, a self-service machine, or the like, which is not limited in this embodiment of this application.

The DCI size alignment apparatus provided in this embodiment of this application can implement the processes implemented in the method embodiment in FIG. 2, with the same technical effects achieved. To avoid repetition, details are not described herein again.

Figure 4:
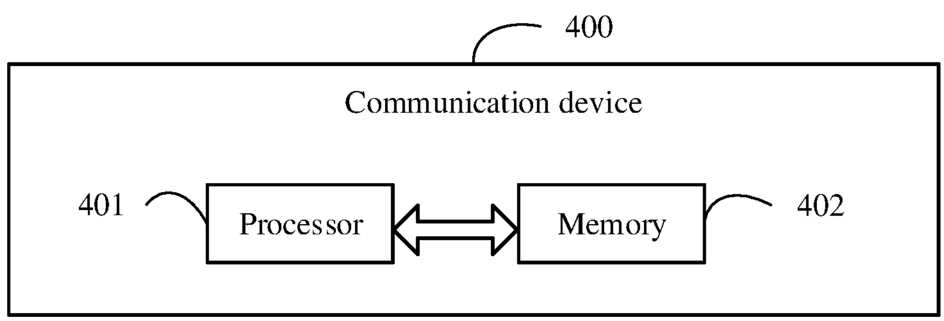
FIG. 4 is a schematic structural diagram of a communication device according to an embodiment of this application.

Optionally, as shown in FIG. 4, an embodiment of this application further provides a communication device 400, including a processor 401, a memory 402, and a program or instructions stored in the memory 402 and executable on the processor 401. For example, when the communication device 400 is a terminal and when the program or the instructions are executed by the processor 401, the processes of the foregoing embodiment of the DCI size alignment method are implemented, with the same technical effects achieved. When the communication device 400 is a network-side device and when the program or the instructions are executed by the processor 401, the processes of the foregoing embodiment of the DCI size alignment method are implemented, with the same technical effects achieved. To avoid repetition, details are not described herein again.

An embodiment of this application further provides a terminal, including a processor and a communication interface. The processor is configured to determine whether a number of DCI sizes of a plurality of DCI formats meets a DCI size budget; and in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS. The terminal embodiments correspond to the foregoing terminal-side method embodiments, and the implementation processes and implementations of the foregoing method embodiments can be applied to the terminal embodiments, with the same technical effects achieved. For example, FIG.

5 is a schematic diagram of a hardware structure of a terminal for implementing the embodiments of this application.

The terminal 500 includes but is not limited to at least part of components such as a radio frequency unit 501, a network module 502, an audio output unit 503, an input unit 504, a sensor 505, a display unit 506, a user input unit 507, an interface unit 508, a memory 509, and a processor 510.

Figure 5:
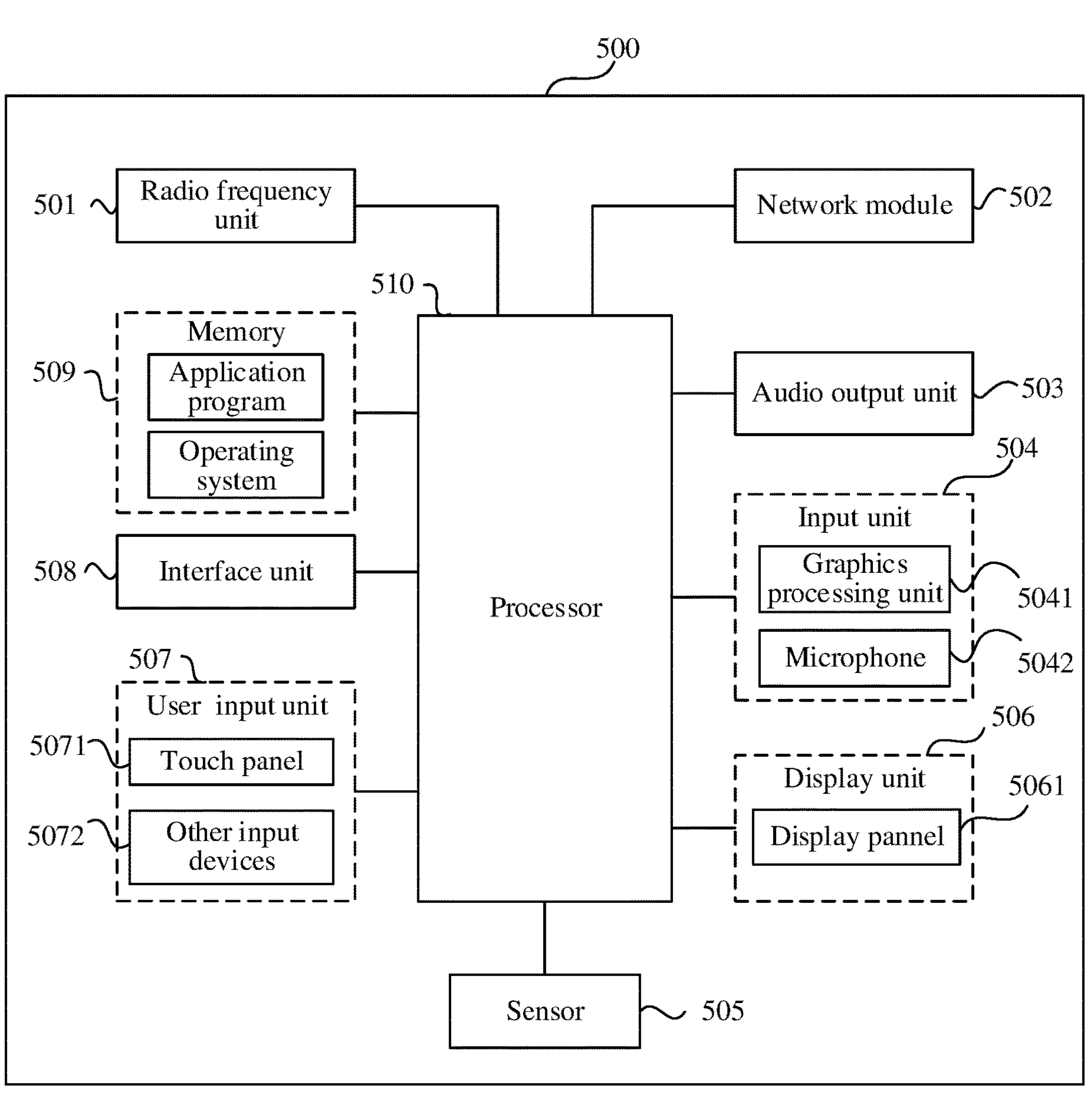
FIG. 5 is a schematic structural diagram of a terminal according to an embodiment of this application.

Persons skilled in the art can understand that the terminal 500 may further include a power supply (for example, a battery) supplying power to the components, and the power supply may be logically connected to the processor 510 through a power management system. In this way, functions such as charge management, discharge management, and power consumption management are implemented by using the power management system. The structure of the terminal shown in FIG. 5 does not constitute any limitation on the terminal. The terminal may include more or fewer components than shown in the figure, or a combination of some components, or the components disposed differently. Details are not described herein again.

It can be understood that in this embodiment of this application, the input unit 504 may include a graphics processing unit (GPU) S041 and a microphone S042. The graphics processing unit S041 processes image data of a still picture or video obtained by an image capture apparatus (such as a camera) in a video capture mode or an image capture mode. The display unit 506 may include a display panel S061, and the display panel S061 may be configured in a form of a liquid crystal display, an organic light-emitting diode, and the like. The user input unit 507 may include a touch panel S071 and other input devices S072. The touch panel S071 is also referred to as a touchscreen. The touch panel S071 may include two parts: a touch detection apparatus and a touch controller. The other input devices S072 may include but are not limited to a physical keyboard, a function key (such as a volume control key or a power on/off key), a trackball, a mouse, a joystick, and the like. Details are not described herein.

In this embodiment of this application, the radio frequency unit 501 receives downlink data from a network-side device, and then sends the downlink data to the processor 510 for processing; and also sends uplink data to the network-side device. Generally, the radio frequency unit 501 includes but is not limited to an antenna, at least one amplifier, a transceiver, a coupler, a low noise amplifier, a duplexer, and the like.

The memory 509 may be configured to store software programs or instructions and various data. The memory 509 may include a program or instruction storage area and a data storage area. The program or instruction storage area may store an operating system, an application program or instruction required by at least one function (for example, a sound playback function or an image playback function), and the like. In addition, the memory 509 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage device, a flash memory device, or another non-transitory solid-state storage device.

The processor 510 may include one or more processing units. Optionally, an application processor and a modem processor may be integrated in the processor 510. The application processor primarily processes an operating system, user interfaces, application programs or instructions, and the like. The modem processor primarily processes radio communication, for example, being a baseband processor. It can be understood that the modem processor may alternatively be not integrated in the processor 510.

The processor 510 may be configured to determine whether a number of DCI sizes of a plurality of DCI formats meets a DCI size budget; and in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS.

In this embodiment of this application, in a case that a new DCI format is introduced, the terminal 500 may perform, according to the DCI size alignment rule, the DCI size alignment operation on the plurality of DCI formats to satisfy the DCI size budget. This embodiment of this application is conducive to maintaining consistent understanding between the network-side device and the terminal, which helps implement valid transmission of DCI. In addition, because the number of DCI sizes of the plurality of DCI formats meets the DCI size budget, this helps reduce complexity of blind detection for the terminal, thereby reducing resource overheads for the terminal.

The terminal 500 provided in this embodiment of this application is capable of implementing the processes of the DCI size alignment method embodiments, with the same technical effects achieved. To avoid repetition, details are not described herein again.

An embodiment of this application further provides a network-side device, including a processor and a communication interface. The processor is configured to determine whether a number of DCI sizes of a plurality of DCI formats meets a DCI size budget; and in a case that the DCI size budget is not met, perform a DCI size alignment operation on the plurality of DCI formats according to a DCI size alignment rule until the DCI size budget is met; where the DCI size alignment rule includes at least one of: aligning a first DCI format with DCI 0_0 and/or DCI 1_0 in a CSS; aligning the first DCI format with DCI 1_1 and/or DCI 0_1 in a USS; aligning the first DCI format with DCI 1_2 and/or DCI 0_2 in the USS; aligning DCI 1_2 and/or DCI 0_2 in the USS with DCI 1_1 and/or DCI 0_1; or aligning the first DCI format with a group common DCI format in the CSS. The network-side device embodiments correspond to the foregoing network-side device method embodiments, and the implementation processes and implementations of the foregoing method embodiments can be applied to the network-side device embodiments, with the same technical effects achieved.

Figure 6:
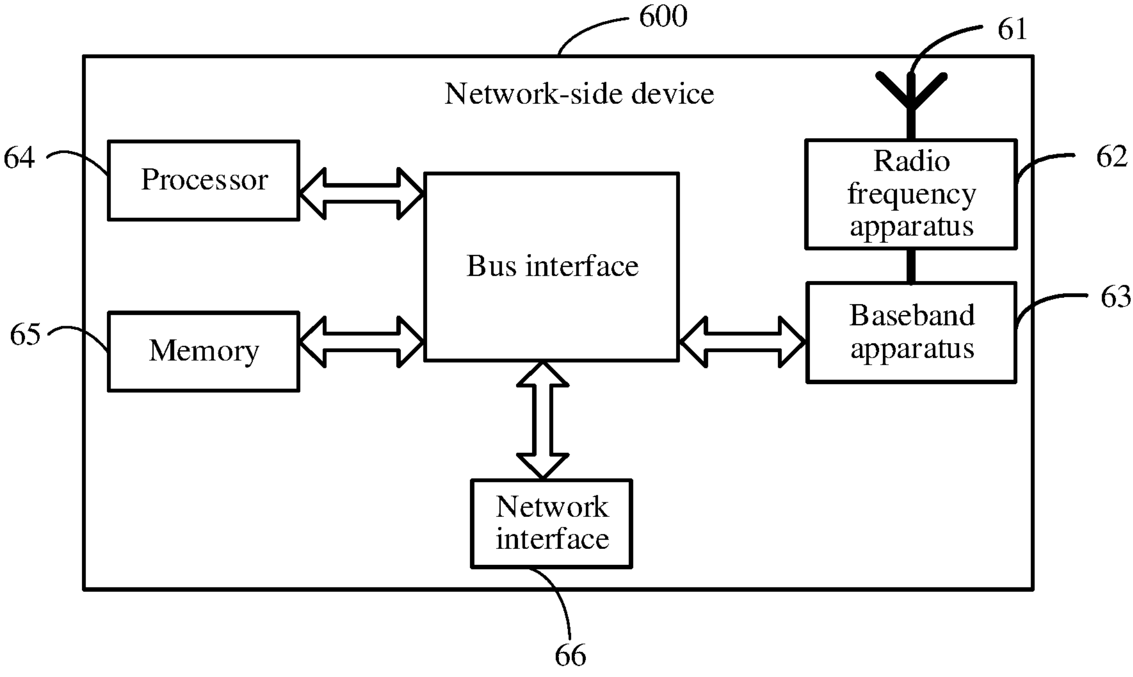
FIG. 6 is a schematic structural diagram of a network-side device according to an embodiment of this application.

For example, an embodiment of this application further provides a network-side device. As shown in FIG. 6, the network-side device 600 includes an antenna 61, a radio frequency apparatus 62, and a baseband apparatus 63. The antenna 61 is connected to the radio frequency apparatus 62. In an uplink direction, the radio frequency apparatus 62 receives information by using the antenna 61, and sends the received information to the baseband apparatus 63 for processing. In a downlink direction, the baseband apparatus 63 processes to-be-sent information, and sends the information to the radio frequency apparatus 62; and the radio frequency apparatus 62 processes the received information and then sends the information out by using the antenna 61.

The DCI size alignment apparatus may be located in the baseband apparatus 63. The method performed by the network-side device in the foregoing embodiments may be implemented in the baseband apparatus 63, and the baseband apparatus 63 includes a processor 64 and a memory 65.

The baseband apparatus 63 may include, for example, at least one baseband board, where a plurality of chips are disposed on the baseband board. As shown in FIG. 6, one of the chips is, for example, the processor 64, connected to the memory 65, to invoke a program in the memory 65 to perform the operation of the network-side device shown in the foregoing method embodiment.

The baseband apparatus 63 may further include a network interface 66, configured to exchange information with the radio frequency apparatus 62, where the interface is, for example, a common public radio interface (CPRI).

For example, the network-side device in this embodiment of this application further includes: instructions or a program stored in the memory 65 and executable on the processor 64. The processor 64 invokes the instructions or program in the memory 65 to execute the method executed by the modules shown in FIG. 3, with the same technical effects achieved. To avoid repetition, details are not repeated herein.

An embodiment of this application further provides a non-transitory readable storage medium, where a program or an instruction is stored in the non-transitory readable storage medium. When the program or the instruction is executed by a processor, the processes of the foregoing embodiment of the DCI size alignment method can be implemented, with the same technical effects achieved. To avoid repetition, details are not described herein again.

The processor is a processor in the terminal described in the foregoing embodiments. The non-transitory readable storage medium includes a non-transitory computer-readable storage medium, for example, a computer read-only memory (ROM), a random access memory (RAM), a magnetic disk, or an optical disc.

An embodiment of this application further provides a chip, where the chip includes a processor and a communication interface. The communication interface is coupled to the processor, and the processor is configured to run a program or instructions to implement the processes of the foregoing embodiments of the DCI size alignment method, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a communication system including a terminal and a network-side device. The terminal may be configured to execute the method described in the foregoing DCI size alignment method embodiments, and the network-side device may be configured to execute the method described in the foregoing DCI size alignment method embodiments.

It should be noted that in this specification, the term "include", "comprise", or any of their variants are intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of this application essentially or the part contributing to the prior art may be implemented in a form of a computer software product. The computer software product is stored in a storage medium (such as a ROM/RAM, a magnetic disk, or an optical disc), and includes several instructions for instructing a terminal (which may be a mobile phone, a computer, a server, an air conditioner, a network-side device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A DCI size alignment method, performed by a communication device, comprising:

performing a downlink control information (DCI) size alignment operation on a plurality of DCI formats according to a DCI size alignment rule; wherein the DCI size alignment rule comprises:

aligning a first DCI format with DCI 1_0 in a common search space (CSS);

wherein the plurality of DCI formats comprise the first DCI format, the first DCI format being used for scheduling a group common physical downlink shared channel (PDSCH);

wherein the aligning a first DCI format with DCI 1_0 in a CSS comprises:

if a DCI size of the first DCI format is less than a first value, performing zero-padding processing on the first DCI format such that the DCI size of the first DCI format is equal to the first value, wherein the first value is a DCI size obtained after alignment of DCI 0_0 and DCI 1_0 in the CSS.

2. The method according to claim 1, wherein the aligning a first DCI format with DCI 1_0 in a CSS further comprises at least one of:

if the DCI size of the first DCI format is greater than the first value, performing truncation processing on the first DCI format such that the DCI size of the first DCI format is equal to the first value; or performing zero-padding or truncation processing on DCI 0_0 and performing zero-padding or truncation processing on DCI 1_0 such that a DCI size of DCI 0_0 and a DCI size of DCI 1_0 are equal to the DCI size of the first DCI format.

3. The method according to claim 1, wherein the DCI size alignment rule further comprises aligning the first DCI format with DCI 1_1 and/or DCI 0_1 in a user equipment-specific search space (USS), and the aligning the first DCI format with DCI 1_1 and/or DCI 0_1 in a USS comprises:

aligning DCI 1_1 in the USS with DCI 0_1 such that a DCI size of DCI 1_1 is equal to a DCI size of DCI 0_1; and in a case that a DCI size budget is not met, performing zero-padding or truncation processing on DCI 1_1 and performing zero-padding or truncation processing on DCI 0_1 such that the DCI size of DCI 1_1 and the DCI size of DCI 0_1 are equal to a DCI size of the first DCI format.

4. The method according to claim 1, wherein the DCI size alignment rule further comprises aligning the first DCI format with DCI 1_1 and/or DCI 0_1 in a user equipment-specific search space (USS), and the aligning the first DCI format with DCI 1_1 and/or DCI 0_1 in a USS comprises:

aligning a second DCI format with the first DCI format such that a DCI size of the second DCI format is equal to a DCI size of the first DCI format; and in a case that a DCI size budget is still not yet is not met, aligning a third DCI format with the first DCI format such that a DCI size of the third DCI format is equal to the DCI size of the first DCI format; wherein the second DCI format is DCI 1_1 or DCI 0_1; and the third DCI format is a DCI format other than the second DCI format in DCI 1_1 and DCI 0_1.

5. The method according to claim 4, wherein the second DCI format comprises one of following:

DCI 1_1;

DCI 0_1;

one of DCI 0_1 and DCI 1_1 that has a DCI size smaller than the DCI size of the first DCI format and that has a DCI size closest to the DCI size of the first DCI format;

one of DCI 0_1 and DCI 1_1 that has a DCI size closest to the DCI size of the first DCI format;

one of DCI 0_1 and DCI 1_1 that has a smaller DCI size; and one of DCI 0_1 and DCI 1_1 that has a larger DCI size.

6. The method according to claim 1, wherein the DCI size alignment rule further comprises aligning the first DCI format with DCI 1_2 and/or DCI 0_2 in a user equipment-specific search space (USS), and the aligning the first DCI format with DCI 1_2 and/or DCI 0_2 in the USS comprises:

aligning DCI 1_2 in the USS with DCI 0_2 such that a DCI size of DCI 1_2 is equal to a DCI size of DCI 0_2; and in a case that a DCI size budget is not met, performing zero-padding or truncation processing on DCI 1_2 and performing zero-padding or truncation processing on DCI 0_2 such that the DCI size of DCI 1_2 and the DCI size of DCI 0_2 are equal to a DCI size of the first DCI format.

7. The method according to claim 1, wherein the DCI size alignment rule further comprises aligning the first DCI format with DCI 1_2 and/or DCI 0_2 in a user equipment-specific search space (USS), and the aligning the first DCI format with DCI 1_2 and/or DCI 0_2 in the USS comprises:

aligning a third DCI format with the first DCI format such that a DCI size of the third DCI format is equal to a DCI size of the first DCI format; and in a case that a DCI size budget is still not yet is not met, aligning a fourth DCI format with the first DCI format such that a DCI size of the fourth DCI format is equal to the DCI size of the first DCI format; wherein the third DCI format is DCI 1_2 or DCI 0_2; and the fourth DCI format is a DCI format other than the third DCI format in DCI 1_2 and DCI 0_2.

8. The method according to claim 7, wherein the third DCI format comprises one of following:

DCI 1_2;

DCI 0_2;

one of DCI 0_2 and DCI 1_2 that has a DCI size smaller than the DCI size of the first DCI format and that has a DCI size closest to the DCI size of the first DCI format;

one of DCI 0_2 and DCI 1_2 that has a DCI size closest to the DCI size of the first DCI format;

one of DCI 0_2 and DCI 1_2 that has a smaller DCI size;

one of DCI 0_2 and DCI 1_2 that has a larger DCI size.

9. The method according to claim 1, wherein the DCI size alignment rule further comprises aligning DCI 1_2 and/or DCI 0_2 in a user equipment-specific search space (USS) with DCI 1_1 and/or DCI 0_1, and the aligning DCI 1_2 and/or DCI 0_2 in the USS with DCI 1_1 and/or DCI 0_1 comprises:

aligning DCI 1_2 in the USS with DCI 0_2 such that a DCI size of DCI 1_2 is equal to a DCI size of DCI 0_2;

in a case that a DCI size budget is not met, aligning DCI 1_1 in the USS with DCI 0_1 such that a DCI size of DCI 1_1 is equal to a DCI size of DCI 0_1; and in a case that the DCI size budget is still not yet met, aligning DCI 1_2 and DCI 0_2 that are obtained through alignment with DCI 1_1 and DCI 0_1 that are obtained through alignment, such that the DCI size of DCI 1_2, the DCI size of DCI 0_2, the DCI size of DCI 1_1, and the DCI size of DCI 0_1 are all equal.

10. The method according to claim 9, wherein the DCI 1_2 and DCI 0_2 comprise indicator bits, or the DCI 1_1 and DCI 0_1 comprise indicator bits; wherein the indicator bits are used to distinguish between a fifth DCI format and a sixth DCI format, the fifth DCI format comprising DCI 1_2 and DCI 0_2, and the sixth DCI format comprising DCI 1_1 and DCI 0_1.

11. The method according to claim 1, wherein the method further comprises: determining the DCI size alignment rule based on at least one of:

a DCI size of DCI 1_1, a DCI size of DCI 0_1, a DCI size of DCI 1_2, a DCI size of DCI 0_2, a DCI size of the first DCI format, or higher-layer signaling configuration.

12. The method according to claim 1, wherein the method further comprises: determining the DCI size of the first DCI format based on at least one of:

a size of each field of the first DCI format determined based on a parameter configuration of a common frequency resource; or higher-layer signaling configuration.

13. The method according to claim 3, wherein the DCI size budget comprises at least one of following that:

a total number of DCI sizes configured for monitoring by a terminal in a scheduled cell does not exceed 4; or a total number of DCI sizes scrambled by cell radio network temporary identity (C-RNTI) and/or group radio network temporary identity (G-RNTI) and configured for monitoring by a terminal in a scheduled cell does not exceed 3.

14. The method according to claim 1, wherein the method further comprises:

determining a DCI size for monitoring within a DCI size budget; and monitoring, based on the determined DCI size, a DCI format obtained through the DCI size alignment operation.

15. A terminal, comprising:

a processor;

a memory; and a program or instructions stored in the memory and executable on the processor, wherein the program or the instructions, when executed by the processor, cause the terminal to perform:

performing a downlink control information (DCI) size alignment operation on a plurality of DCI formats according to a DCI size alignment rule; wherein the DCI size alignment rule comprises:

aligning a first DCI format with DCI 1_0 in a common search space (CSS);

wherein the plurality of DCI formats comprise the first DCI format, the first DCI format being used for scheduling a group common physical downlink shared channel (PDSCH);

wherein the aligning a first DCI format with DCI 1_0 in a CSS comprises:

if a DCI size of the first DCI format is less than a first value, performing zero-padding processing on the first DCI format such that the DCI size of the first DCI format is equal to the first value, wherein the first value is a DCI size obtained after alignment of DCI 0_0 and DCI 1_0 in the CSS.

16. The terminal according to claim 15, wherein the aligning a first DCI format with DCI 1_0 in a CSS further comprises at least one of:

if the DCI size of the first DCI format is greater than the first value, performing truncation processing on the first DCI format such that the DCI size of the first DCI format is equal to the first value; or performing zero-padding or truncation processing on DCI 0_0 and performing zero-padding or truncation processing on DCI 1_0 such that a DCI size of DCI 0_0 and a DCI size of DCI 1_0 are equal to the DCI size of the first DCI format.

17. The terminal according to claim 15, wherein the DCI size alignment rule further comprises aligning the first DCI format with DCI 1_1 and/or DCI 0_1 in a user equipment-specific search space (USS), and the aligning the first DCI format with DCI 1_1 and/or DCI 0_1 in a USS comprises:

aligning DCI 1_1 in the USS with DCI 0_1 such that a DCI size of DCI 1_1 is equal to a DCI size of DCI 0_1; and in a case that a DCI size budget is not met, performing zero-padding or truncation processing on DCI 1_1 and performing zero-padding or truncation processing on DCI 0_1 such that the DCI size of DCI 1_1 and the DCI size of DCI 0_1 are equal to a DCI size of the first DCI format.

18. The terminal according to claim 15, wherein the DCI size alignment rule further comprises aligning the first DCI format with DCI 1_1 and/or DCI 0_1 in a user equipment-specific search space (USS), and the aligning the first DCI format with DCI 1_1 and/or DCI 0_1 in a USS comprises:

aligning a second DCI format with the first DCI format such that a DCI size of the second DCI format is equal to a DCI size of the first DCI format; and in a case that a DCI size budget is not met, aligning a third DCI format with the first DCI format such that a DCI size of the third DCI format is equal to the DCI size of the first DCI format; wherein the second DCI format is DCI 1_1 or DCI 0_1; and the third DCI format is a DCI format other than the second DCI format in DCI 1_1 and DCI 0_1.

19. A network-side device, comprising:

a processor;

a memory; and a program or instructions stored in the memory and executable on the processor, wherein the program or the instructions, when executed by the processor, cause the network-side device to perform:

performing a downlink control information (DCI) size alignment operation on a plurality of DCI formats according to a DCI size alignment rule; wherein the DCI size alignment rule comprises:

aligning a first DCI format with DCI 1_0 in a common search space (CSS);

wherein the plurality of DCI formats comprise the first DCI format, the first DCI format being used for scheduling a group common physical downlink shared channel (PDSCH);

wherein the aligning a first DCI format with DCI 1_0 in a CSS comprises:

if a DCI size of the first DCI format is less than a first value, performing zero-padding processing on the first DCI format such that the DCI size of the first DCI format is equal to the first value, wherein the first value is a DCI size obtained after alignment of DCI 0_0 and DCI 1_0 in the CSS.

20. The method according to claim 1, wherein the performing the DCI size alignment operation on the plurality of DCI formats according to the DCI size alignment rule comprises:

determining whether a number of DCI sizes of the plurality of DCI formats meets a DCI size budget; and in a case that the DCI size budget is not met, performing the DCI size alignment operation on the plurality of DCI formats according to the DCI size alignment rule until the DCI size budget is met.

* * * * *